United States Patent [19]

Baumbach

[11] 4,390,921

[45] Jun. 28, 1983

[54] LINE PROTECTOR AND RELATED TERMINATION ARRANGEMENT

[75] Inventor: Bertram W. Baumbach, Arlington Heights, Ill.

[73] Assignee: Reliance Electric Company, Cleveland, Ohio

[21] Appl. No.: 310,473

[22] Filed: Oct. 13, 1981

[51] Int. Cl.³ .......................... H02H 3/20; H05K 5/02
[52] U.S. Cl. ..................................... 361/119; 361/399
[58] Field of Search ........................ 361/119, 399, 426; 337/34, 28; 315/36; 339/198 P, 198 S, 198 R, 179 MP; 179/98

[56] References Cited

U.S. PATENT DOCUMENTS

| | | | |
|---|---|---|---|
| 3,255,330 | 6/1966 | MacKenzie et al. | 200/124 |
| 3,518,611 | 6/1970 | Shores, Jr. | 339/18 |
| 3,535,463 | 10/1970 | Trucco | 179/98 |
| 3,567,998 | 3/1971 | Ammerman | 361/399 |
| 3,587,021 | 6/1971 | Baumbach | 337/32 |
| 3,610,836 | 10/1971 | Kimura et al. | 179/98 |
| 3,760,328 | 9/1973 | Georgopulos | 339/18 R |
| 3,852,643 | 12/1974 | Seki et al. | 361/399 X |
| 3,947,732 | 3/1976 | Cwirzen | 317/122 |
| 4,017,770 | 4/1977 | Valfre | 361/399 |
| 4,057,692 | 11/1977 | DeBortoli et al. | 179/98 |
| 4,146,755 | 3/1979 | Causse | 361/119 X |
| 4,325,100 | 4/1982 | Baumbach | 361/119 |

FOREIGN PATENT DOCUMENTS 1494344 12/1977 United Kingdom .

*Primary Examiner*—Reinhard J. Eisenzopf
*Attorney, Agent, or Firm*—Trexler, Bushnell & Wolters, Ltd.

[57] ABSTRACT

A line protector and associated termination structure comprises a module having printed circuit board wiring internally thereof and also as outwardly projecting contacts adapted for connection to a printed circuit board edge connector. An insulator is disposed against the printed circuit board and is slidable therealong and optionally serves to interrupt the tip in and ring in sides of the telephone line when it is desired to place the protector module in the so-called "detent" position. The protector module may be restored to its normal operating condition by retracting the insulator or by removing the module entirely from its position in the connector and then reinserting the module fully into the connector. This latter operation automatically slides the insulator to its non-detent position.

11 Claims, 12 Drawing Figures

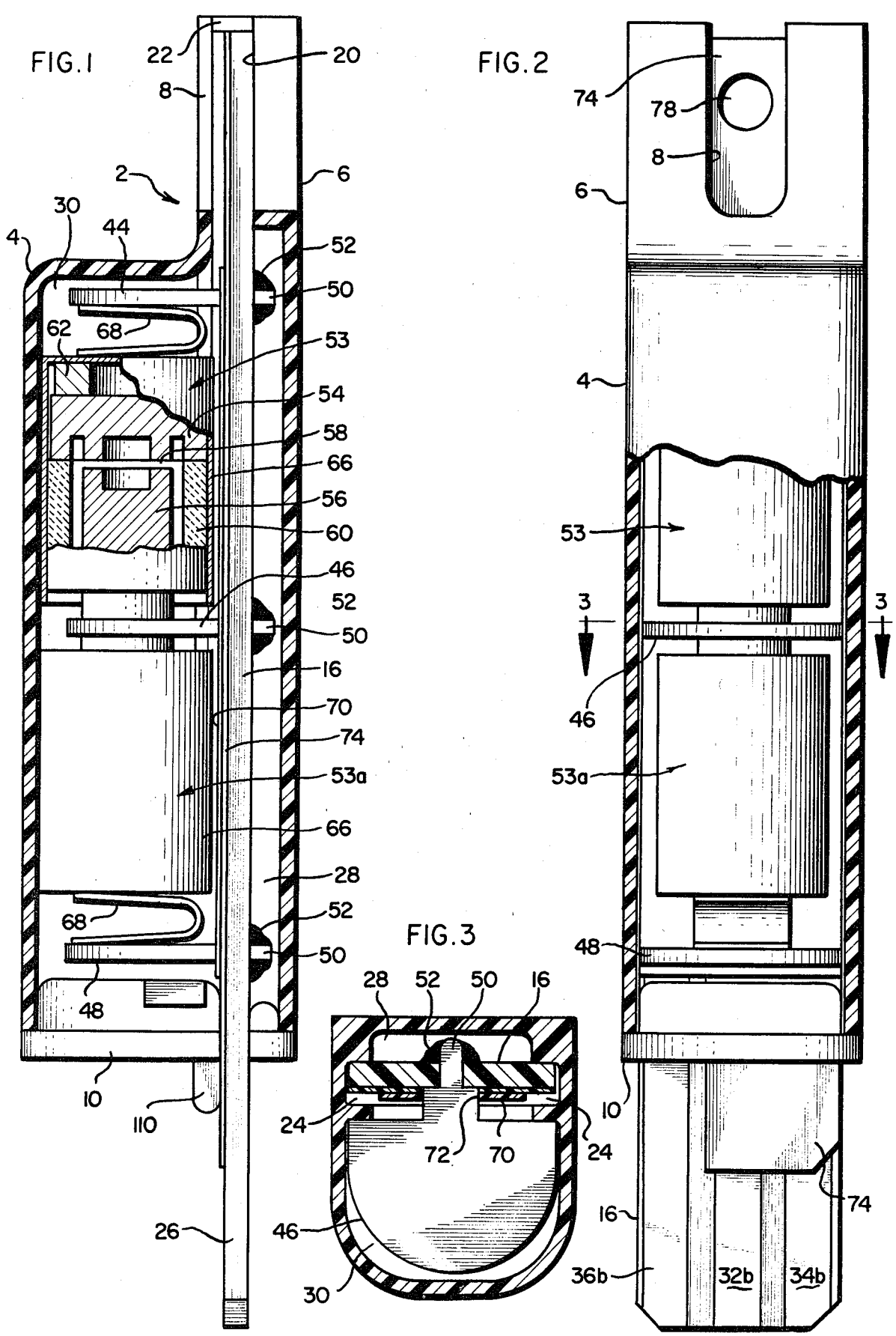

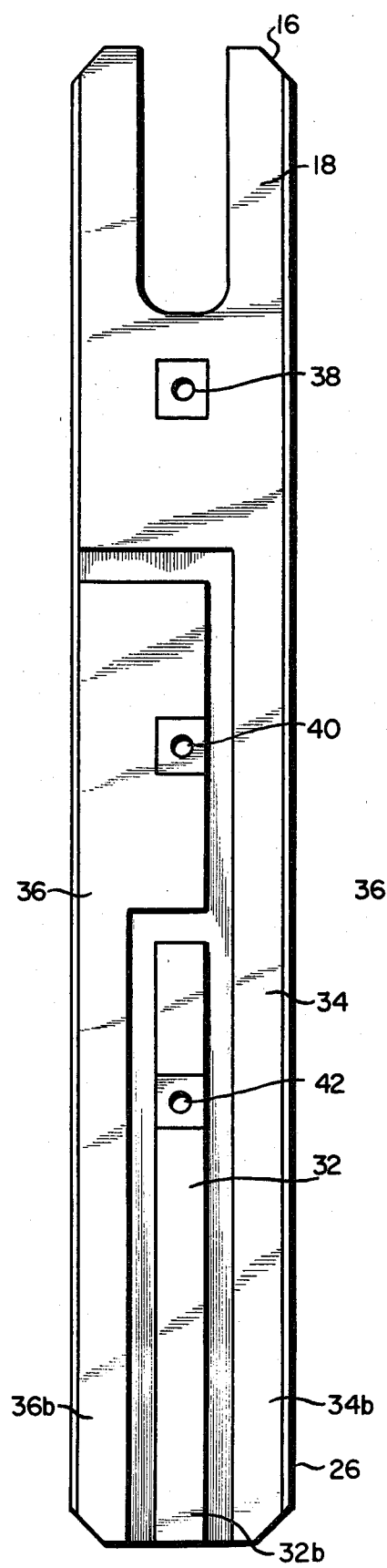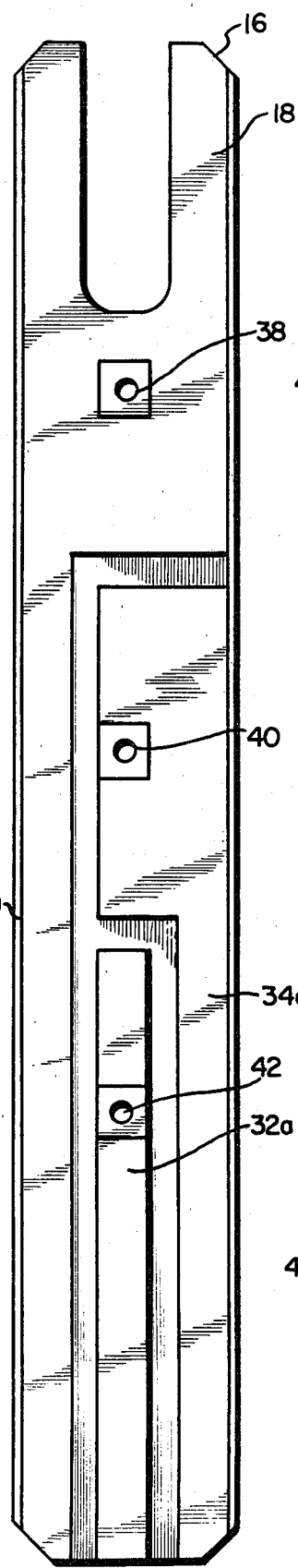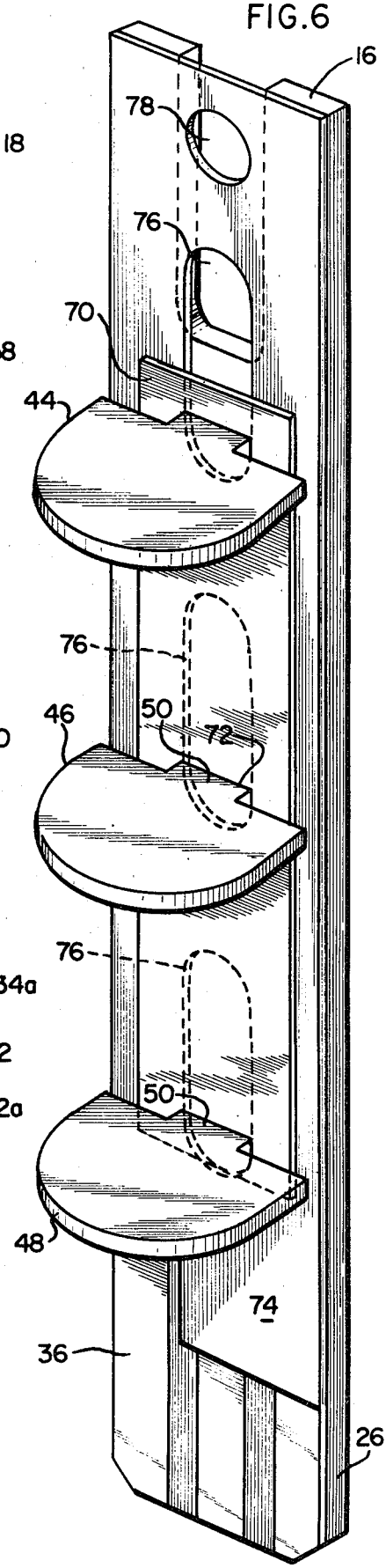

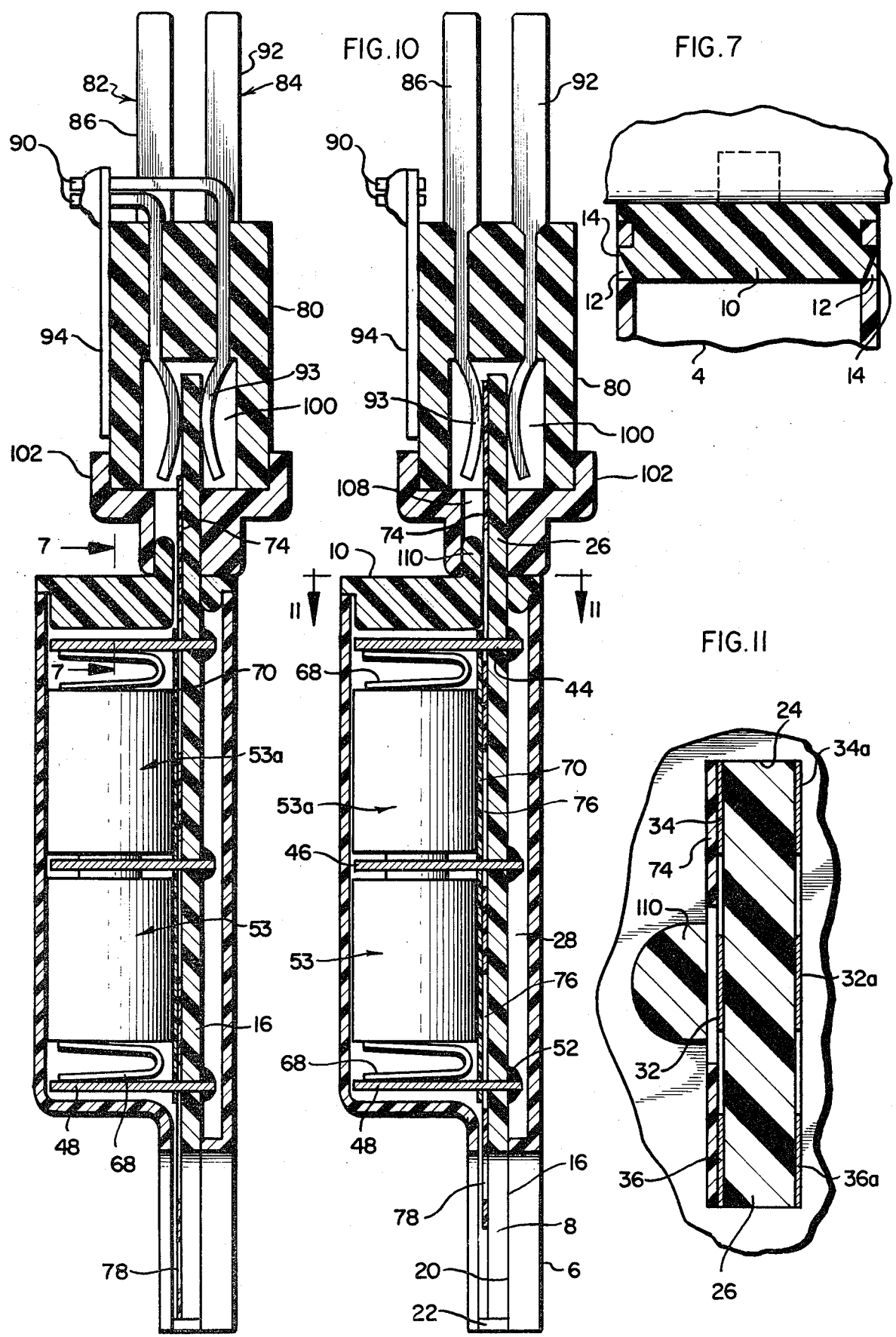

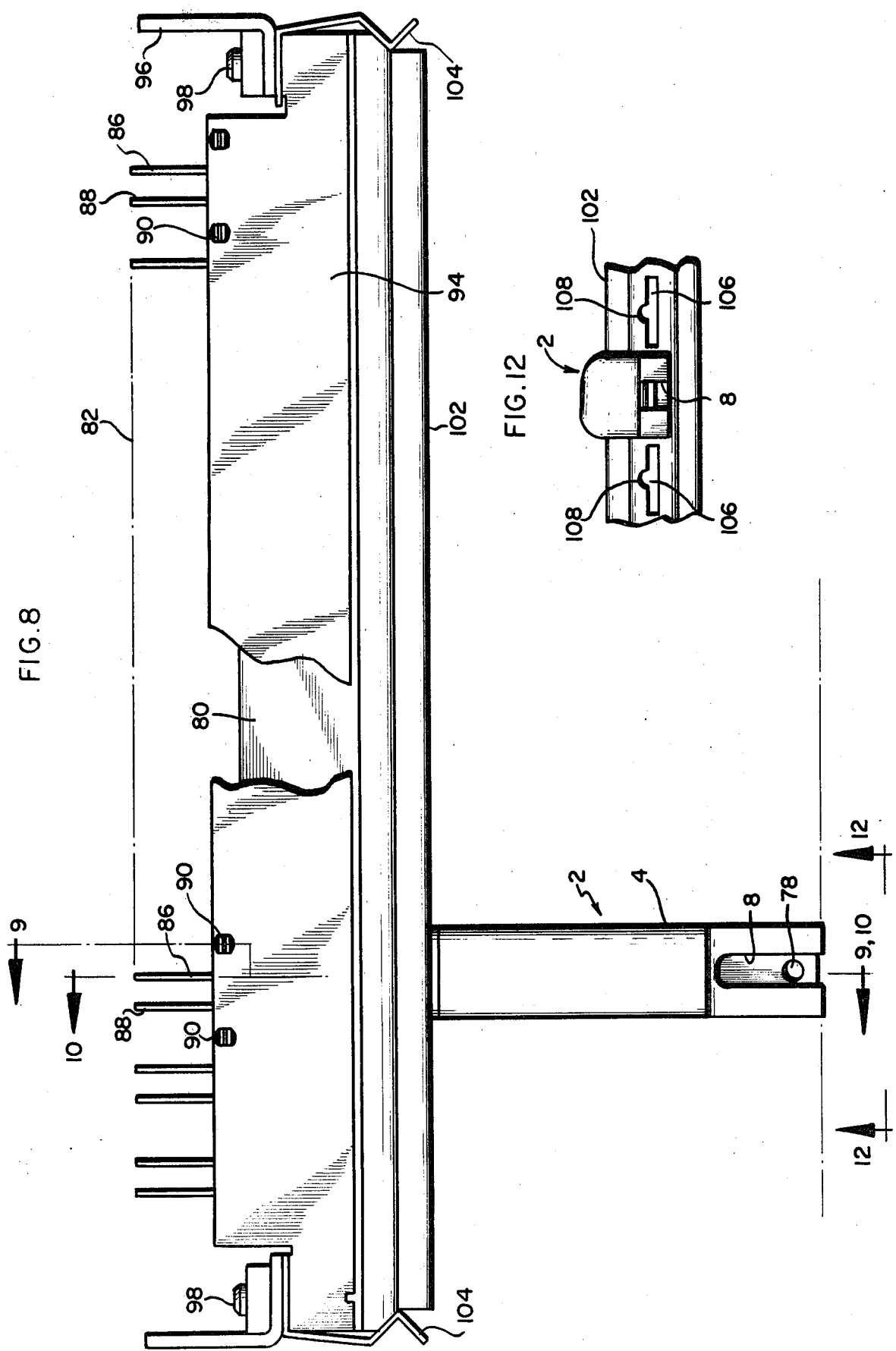

LINE PROTECTOR AND RELATED TERMINATION ARRANGEMENT

BACKGROUND OF THE INVENTION

This invention relates generally to telephone circuit distribution systems, and more particularly to systems having overload protector modules that provide line protection for the inside plant equipment, such as central office switching equipment and the like.

It is known to provide telephone main distribution frames with circuitry having plug-in line protector modules in order to prevent surge voltages on the outside lines from reaching the inside plant equipment. Connectors or panels are used on the frames for wire termination. These connectors are mounted close together because space is at a premium. For that reason downsizing of the connector panel and protector module structure is a frequently sought-out objective in the art.

Various types of modules are known. The most common is the type with line terminal pins that plug into holes in the connector. However, with pin terminal type modules there is a practical limit to the size to which the module can be reduced. Furthermore, the connector itself can only be reduced by so much because the connector must retain a pattern of holes compatible with the module pins.

OBJECTS AND SUMMARY OF THE INVENTION

An object of this invention is to provide a novel line protector for a communications circuit plus a new "panel" or connector which interfaces the line protector to form a termination structure that is relatively small as compared to current commercially available arrangements.

A further object of this invention is to provide an arrangement of the type stated in which the module utilizes a printed circuit board for substantially all of its internal wiring and also utilizes that same printed circuit board for the ground and line terminals of the module.

An additional object of this invention is to provide a module of the type stated which can be plugged into a standard printed circuit board edge connector but which connector is modified to provide a ground buss which occupies only a minimum of space.

Another object of this invention is to provide a module and edge connector arrangement that can be utilized, for example, in 25 pair groups to be compatible with 25 pair cable groups. If desired each 25 pair or other designated group and associated wiring may be a package complete in itself. Consequently, any number of 25 pair groups may be added or subtracted to an array which may typically be a 900 pair assembly on a main distribution frame.

A still further object of this invention is to provide an arrester module of the type stated which has a unique method of providing a so-called "detent" position. In this so-called "detent" position the line from the inside plant equipment to the protector is an open circuit. In the present invention the circuit is opened by a sliding insulator which is shiftable from a first position in which the inside line circuit is closed to a second position in which the insulator acts to open the inside line circuit. Furthermore, the invention provides an arrangement by which the accidental bumping of the module, which might cause it to change its preset position, is effectively prevented. Additionally, means are provided for visually detecting the position of the insulator through a window or slot in the handle of the module.

In accordance with the foregoing objects the invention comprises a line protector with a housing having opposite ends, a printed circuit board in said housing and having a part thereof projecting from one of said housing ends, first and second line terminals printed on said board and being electrically insulated from each other, a ground terminal printed on said board and being electrically insulated from each of said line terminals, said printed terminals extending from within the housing to said projected part of the board so as to lie outwardly of said housing and adjacent to one another, a first contact in said housing adjacent to said one end and being electrically connected to said first line terminal, a second contact in said housing adjacent to the other end of said housing being electrically connected to said second terminal, and a third contact in said housing intermediate the first and second contacts and being electrically connected to said ground terminal; and surge voltage arrester means between said first and second contacts and having a first electrode electrically connected to said first contact, a second electrode electrically connected to said second contact, and a ground electrode structure electrically connected to said third contact; each of said contacts being secured to the printed circuit board and projecting therefrom.

The insulator referred to previously is a flat sheet movable relative to said board to overlie the portions of said first and second terminals that are on said projected part while leaving exposed the ground terminal portion on said projected part.

In a further aspect of the invention there is provided a termination structure comprising a housing, a surge voltage arrester in said housing and having opposed contacts, a line terminal electrically connected to one of said contacts and adapted to be connected to a line to be protected, a ground terminal electrically connected to the other of said contacts such that a surge on said line will be shunted through said arrester to said ground terminal, said terminals having parts projecting outwardly of said housing, a connector having a recess, contacts in said recess for plug-in engagement with said outwardly projected parts of said terminals, and an insulator adjacent to the outwardly projected part of a line terminal and shiftable to and from a first position that is free from obstructing the engagement of said outwardly projected line terminal part with its associated contact when said terminals are plugged into said connector to a second position in which said insulator is between said associated contact and line terminal part to interrupt the circuit from said associated contact to said surge voltage arrester.

BRIEF DESCRIPTION OF THE FIGURES

FIG. 1 is a side elevational view, partially broken away and in section, of a protector module constructed in accordance with and embodying the present invention;

FIG. 2 is a front elevational view of the module as seen from the left hand side of FIG. 1, also partly broken away and in section;

FIG. 3 is a sectional view taken along line 3—3 of FIG. 2;

FIG. 4 is a plan view of one side of the circuit board which forms part of the module;

FIG. 5 is a plan view of the opposite side of the circuit board shown in FIG. 4;

FIG. 6 is a fragmentary perspective view showing a subassembly portion of the module but with the housing and arrester units removed in order to show structural details which might otherwise be obscured;

FIG. 7 is a fragmentary sectional view taken along line 7—7 of FIG. 9;

FIG. 8 (on the sheet containing FIG. 12) is a plan view, partially broken away, of a module plugged into a printed circuit board edge connector, which connector is adapted to support a plurality of such modules and thereby form an interface between numerous pairs of incoming and outgoing lines;

FIG. 9 is a sectional view taken along line 9—9 of FIG. 8;

FIG. 10 is a sectional view taken along line 10—10 of FIG. 8 and showing the module in the so-called "detent" position;

FIG. 11 is a sectional view on an enlarged scale taken along line 11—11 of FIG. 10; and FIG. 12 is a fragmentary view as seen from line 12—12 of FIG. 8.

DETAILED DESCRIPTION

Referring now in more detail to the drawing and particularly to FIGS. 1-3 there is shown a protector module 2 comprising a generally rectilinear housing 4 of plastic or like dielectric material and having opposite ends. At one end of the housing 4 is a bifurcated handle 6 that provides a window or slot 8 for purposes presently more fully appearing. At its other end the housing 4 receives a base 10 of like plastic and which may be snapped into place as best seen in FIG. 7. Thus, opposed walls of the housing 4 are provided with notches 12, 12 that receive nibs 14 on the base 10. The opposed housing walls are sufficiently yieldable within elastic limits to allow the nibs 14 to pass thereover and snap fit into the notches 12.

Positioned within the housing 2 is a dielectric printed circuit board 16 having an upper bifurcated end portion 18 that lies within a pocket 20 that is formed by the plastic at the handle 6. The end of the pocket 20 is closed off by a section of plastic 22, and marginal portions of the plastic of the handle define the window or slot 8. The printed circuit board also fits in a pair of opposed channels 24, 24 on opposite sides of the housing, and the lower portion 26 of the printed circuit board project outwardly from the housing, as best seen in FIGS. 1 and 2. It will be noted that the housing, as illustrated in FIGS. 1 and 2, is inverted from the positions of the housing shown in FIGS. 8-10. In any event, the printed circuit board 16 fits snugly within the housing, and the back side of the printed circuit board faces a clearance channel 28. The forward side of the printed circuit board is presented to the main cavity 30 of the module for purposes presently more fully appearing.

The printed wiring on the printed circuit board 16 is best shown in FIGS. 4 and 5. Because of the scale of the drawing, the printed circuit wiring is not shown in FIGS. 1-3, 7-10 and 12. The printed circuit wiring includes a first line terminal 32, a second line terminal 34 and ground terminal 36. The patterns of the respective terminals 32, 34, 36 are, as shown in FIG. 4, insulated from each other. As compared to FIG. 4 the reverse side of the printed circuit board is shown in FIG. 5. Imprinted thereon are line terminal wirings 32a, 34a and ground terminal wiring 36a which correspond to and are in registration respectively with the printed wirings 32, 34, 36. Each terminal 32, 32a or 34, 34a or 36, 36a includes a mounting hole region 38, 40, 42 which regions are preferably equally spaced along the length of the printed circuit board.

Projecting through the mounting holes at the regions 38, 40, 42 are parallel metal contact plates 44, 46, 48 which are parallel to each other and perpendicular to the plane of the printed circuit board. Each contact plate 44, 46, 48 includes a nib 50 that projects through the printed circuit board and is secured by solder 52, whereby the nibs 50 and the solder 52 occupy portions of the clearance channel 28. Furthermore, electrical continuity is established between the printed wiring portions of the respective terminals on opposite sides of the printed circuit board. Additionally the outwardly projected part 26 of the printed circuit board includes outwardly projected terminals portions 32b, 34b, 36b on both sides of the printed circuit board and which are parallel to each other for insertion into the circuit board edge connector shown in FIGS. 8-12, as will be presently more fully described.

Between the contact plates 44, 46 is a surge voltage arrester 53 comprising a pair of carbon electrodes 54, 56 that define an arc gap 58 therebetween. The electrode 56 is surrounded by and is mounted in a tubular ceramic insulator 60 upon which is seated the electrode 54. Electrode 56 is recessed within the ceramic to the extent necessary to establish the arc gap 58. A solder ring 62 is located between the electrode 54 and the end of a metallic cup 66 which houses the electrodes 54, 56, the ceramic 60 and the solder 62. A U-shaped conductive spring is disposed between the cup 66 and the contact plate 44 to provide a conductive connection between the plate 44 and the electrode 54. The spring 68 also presses electrode 56 into contact with the plate 46. Since plate 44 is connected to a line terminal 34 the electrode 54 will be in conductive connection with the line to be protected. Plate 46 is connected to the ground terminal 36 and will therefore be grounded in the manner provided by the system. In a surge condition of short duration the high voltage across the arc gap 58 will cause it to break down and ground the surge. If the surge is sustained, the heat from the current developed will melt the solder ring 62 and the spring 68 will press the rim of the cup 66 into engagement with the ground contact plate 46. A like surge voltage 53a is disposed between the plate 48 and the ground plate 46. Since this arrester unit 53a is of the same construction as the unit 53 the unit 53a need not be shown or described in detail. It should be noted that in place of carbon electrodes a cold cathode gas tube may be used in a manner known in the art.

Because of the close proximity of the cups 66 with the printed circuit board 16 an insulator barrier is inserted between the arrester unit cups and the printed circuit board. For this purpose a rectangular sheet 70 of insulating material is disposed between the plates 44, 46, 48 and the surface of the printed circuit board. The sheet 70 is notched as in 72, 72, 72 for receiving the respective plates 44, 46, 48 and by which the insulating sheet 70 is secured in place.

Between the insulator sheet 70 and the circuit board is an insulator 74 which is shiftable relative to the circuit board 16. The insulator 74 is provided with three elongated slots 76, 76, 76 through which the plates 44, 46, 48 project; however, the elongated slot 76 permits longitudinal movement of the insulator 74. At one end the insulator 74 has a hole 78 which is exposed to the window 8 and through which a tool may be inserted for manipulating the insulator 74. At its opposite end the insulator 74 is cut away in the region of the ground terminal part 36b so that when the insulator 74 is shifted so that its end nearest the plate 48 covers the terminal portions 32b, 34b, the ground terminal portion 36b will still remain exposed.

Referring now to FIGS. 9-12 there is shown a module mounted on an edge connector 80. Only one module is shown, it being apparent that other modules of like construction may be mounted next to the module shown so as to fill up the edge connector 80. The printed circuit board edge connector 80 has a long narrow plastic dielectric body with two rows of terminals 82, 84. Such an edge connector is economical on space. For telephone lines the row 82 may be considered as having a tip out terminal 86, a ring out terminal 88 and a ground terminal 90. There is also a tip in terminal 92 and a ring in terminal (not shown) similar to the terminal 92 though opposite to the ring out terminal 88. The parts of the terminals 86, 88, 92 etc. outside the dielectric body may be wire-wrap terminals or they may be used for plug-in mass termination with a companion connector. The ground terminals 90 are bent at right angles, as shown in FIG. 9, and each is soldered to a ground buss 94 that is adjacent to one side of the edge connector body. The edge connector is secured to a main distribution frame or like support 96 through bolt and nut assemblies 98 and through which the ground buss 94 is electrically connected to the frame 96 for grounding purposes. Other like edge connectors may be secured to the main frame in a similar manner.

The edge connector has a recess 100 in which the terminals 86, 88, 92 etc. are bowed to form resilient arcuate terminations 93 that spread apart to receive the edge portion 26 of the circuit board 16. With the insulator 74 retracted, namely as shown in FIG. 9, the terminal 32 will be in electrical contact with the tip in and tip out terminals 96 to provide protection through the surge arrester 53a. At the same time the ring in and ring out terminals will be in conductive connection with the printed circuit board terminal 34 to provide protection for the ring side of the line through the surge voltage arrester 53. Ground will be maintained through the ground terminals 90 which contact the printed circuit board ground terminal 36. When it is desired to place the module 2 in the detent position, as shown in FIG. 10, a suitable tool may be inserted into the hole 78 whereupon the insulator 74 may be pushed toward the edge connector 80 until the end of the insulator 74 separates the tip out terminal 86 from the adjacent printed circuit board terminal 32 (FIG. 11). At the same time and in like manner the ring out terminal is separated from the printed circuit board terminal 36 so that the insulator 74 opens both the tip and ring circuits to the central office or inside plant equipment. The ground circuits through the arresters 53, 53a from tip in and ring in remain unaffected because the insulator 74 is cut away as previously described and so does not interrupt the ground circuits.

Resetting the protector module for normal use is relatively simple. This can be done by inserting a tool in the hole 78 to retract the insulator 74 from the edge connector contact parts 93. Additionally, the module may be grasped by its handle 6 and completely extracted from its position in the edge connector and then pushed back fully into the edge connector. This causes the sliding insulator 74 to shift and automatically reset itself to its non-detent position (FIG. 9).

In order to facilitate insertion of each module into the edge connector 80 a plastic bezel 102 fits over the opening into the edge connector cavity 100. This bezel 102 is secured to the frame 96 by spring clips 104. The bezel has a series of elongated slots 106 (FIG. 12) each for receiving the printed circuit board of one module. The slot includes a polarizing recess 108 that receives a polarizing nib 110 on the base 10 of the housing. This nib 110 insures that the module is plugged in correctly.

The invention is claimed as follows:

1. A line protector for a communications circuit comprising a housing having opposite ends, a printed circuit board in said housing and having a part thereof projecting from one of said housing ends, first and second line terminals printed on said board and being electrically insulated from each other, a ground terminal printed on said board and being electrically insulated from each of said line terminals, said printed terminals extending from within the housing to said projected part of the board so as to lie outwardly of said housing and adjacent to one another, a first contact in said housing adjacent to said one end and being electrically connected to said first line terminal, a second contact in said housing adjacent to the other end of said housing and being electrically connected to said second terminal, and a third contact in said housing intermediate the first and second contacts and being electrically connected to said ground terminal; and surge voltage arrester means between said first and second contacts and having a first electrode electrically connected to said first contact, a second electrode electrically connected to said second contact, a ground electrode structure electrically connected to said third contact, each of said contacts being secured to the printed circuit board and projecting therefrom, and an insulator movable relative to said board to overlie the portions of said first and second terminals that are on said projected part while leaving exposed the ground terminal portion on said projected part.

2. A line protector according to claim 1 in which said contacts comprise parallel plates that are substantially perpendicular to said board.

3. A line protector according to claim 1 in which said arrester means comprises a pair of surge arresters each having a pair of opposed electrodes, one electrode of one arrester being connected to said first contact, one electrode of the other arrester being connected to the second contact, and the remaining two electrodes being connected to said third contact.

4. A line protector according to claim 1 in combination with a printed circuit board edge connector and in which said projected part of the printed circuit board is in said edge connector, said edge connector having contacts clinching respectively said line terminals and said ground terminal.

5. A termination structure for communications lines comprising a housing, a surge voltage arrester in said housing and having opposed contacts, a line terminal electrically connected to one of said contacts and adapted to be connected to a line to be protected, a ground terminal electrically connected to the other of said contacts such that a surge on said line will be shunted through said arrester to said ground terminal, said terminals having parts projecting outwardly of said housing, a connector having a recess, contacts in said recess for plug-in engagement with said outwardly projected parts of said terminals, and an insulator adjacent to the outwardly projected part of the line terminal and shiftable to and from a first position that is free from obstructing the engagement of said outwardly projected line terminal part with its associated contact when said terminals are plugged into said connector to a second position in which said insulator is between said associated contact and line terminal part to interrupt the circuit from said associated contact to said surge voltage arrester.

6. A termination structure according to claim 5 in which said line terminal is flat, and said insulator is a sheet disposed against said line terminal and is slidable therealong.

7. A termination structure according to claim 5 or claim 6, in which said insulator is in part in said housing and said terminals are in the same plane 8. A termination structure according to claim 5 including wire-connecting means on said connector for terminating an incoming line, means forming a first electric circuit from said wire-connecting means to said one of the opposed surge voltage arrester contacts, wire-connecting means on said connector for terminating an inside line, and means including said outwardly projected line terminal part and said associated contact forming a second electric circuit from said lastmentioned wire-connecting means to said one surge voltage arrester contact, whereby said insulator is operable to interrupt said second circuit.

9. A termination structure according to claim 5 in which said terminals are flat, and said connector is a connector in which the contacts in said recess are aligned.

10. A termination structure according to claim 5 in which said insulator, if in said second position when said arrester is unplugged from said connector, is automatically shifted to said first position when the arrester is plugged into said connector.

11. A termination structure for communications lines comprising a housing, a surge voltage arrester means in said housing and having contacts, a first line terminal electrically connected to one of said contacts and adapted to be connected to one line of a line pair to be protected, a second line terminal electrically connected to another of said contacts and adapted to be connected to the other line of a line pair to be protected, a ground terminal electrically connected to a third of said contacts such that a surge on either of said lines will be shunted through said arrester means to said ground terminal, said terminals having parts projecting outwardly of said housing to provide three parallel terminal regions in the same plane, a connector having an elongated body with a recess, aligned contacts in said recess for plug-in engagement with said terminal regions, the contacts in said recess being on opposite sides of said outwardly projected parts and being spread apart upon inserting said outwardly projected parts therebetween, and means on said connector for guiding said outwardly projecting parts along a predetermined path as they are inserted into said connector, said last-named means being a bezel attached to said connector, and said bezel and housing having cooperating means for polarizing the connections of said terminal regions with the connector contacts.

* * * * *